United States Patent
Brader

(10) Patent No.: US 11,665,615 B2
(45) Date of Patent: May 30, 2023

(54) AIR TRAFFIC CONTROL SYSTEM AS WELL AS METHOD OF SIMULTANEOUS CALL TRANSMISSION HANDLING

(71) Applicant: Rohde & Schwarz GmbH & Co. KG, Munich (DE)

(72) Inventor: Leonhard Brader, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 662 days.

(21) Appl. No.: 16/708,119

(22) Filed: Dec. 9, 2019

(65) Prior Publication Data

US 2020/0219403 A1    Jul. 9, 2020

(30) Foreign Application Priority Data

Jan. 7, 2019 (EP) ..................... 19150525

(51) Int. Cl.
  *H04W 40/12* (2009.01)
  *G08G 5/00* (2006.01)
  *H04L 5/00* (2006.01)

(52) U.S. Cl.
  CPC .......... *H04W 40/12* (2013.01); *G08G 5/0043* (2013.01); *H04L 5/0055* (2013.01); *G08G 5/0013* (2013.01); *G08G 5/0026* (2013.01)

(58) Field of Classification Search
  CPC ... H04W 40/12; G08G 5/0043; G08G 5/0013; G08G 5/0026; G08G 5/0017; H04L 5/0055; H04B 7/18506
  USPC ........................................... 342/393
  See application file for complete search history.

(56) References Cited

U.S. PATENT DOCUMENTS

| 6,308,052 | B1 | 10/2001 | Jamali et al. | |
|---|---|---|---|---|
| 2008/0030375 | A1* | 2/2008 | Cotton | G08G 5/025 |
| | | | | 701/120 |
| 2016/0272341 | A1* | 9/2016 | Van Horn | G08G 5/0021 |
| 2019/0158196 | A1 | 5/2019 | Erhard | |

FOREIGN PATENT DOCUMENTS

| CN | 101578761 | A | 11/2009 | |
|---|---|---|---|---|
| CN | 103733512 | A | 4/2014 | |
| CN | 105324970 | A | 2/2016 | |
| CN | 108886375 | A | 11/2018 | |
| DE | 102016205609 | A1 | 10/2017 | |
| WO | 2017/174237 | A1 | 10/2017 | |
| WO | WO-2017174237 | A1 * | 10/2017 | ........... H04B 1/1027 |

* cited by examiner

*Primary Examiner* — Mang Hang Yeung
(74) *Attorney, Agent, or Firm* — Christensen O'Connor Johnson Kindness PLLC

(57) ABSTRACT

An air traffic control system is described that comprises at least two aircraft radios and a ground system. The ground system has an operator device and at least one ground radio station configured to communicate with the at least two aircraft radios. The ground system has a simultaneous transmission detection unit that is configured to detect at least two aircraft radio signals received simultaneously by the at least one ground radio station. The at least one ground radio station is configured to forward information with regard to the simultaneous transmission detection of at least two aircraft radio signals to at least one of the at least two aircraft radios. Furthermore, a method of simultaneous call transmission handling is described.

20 Claims, 2 Drawing Sheets

AIR TRAFFIC CONTROL SYSTEM AS WELL AS METHOD OF SIMULTANEOUS CALL TRANSMISSION HANDLING

TECHNICAL FIELD

Embodiments of the present disclosure relate to an air traffic control system as well as a method of simultaneous call transmission handling.

BACKGROUND

In the state of the art, air traffic control (ATC) systems are known that use amplitude modulation (AM) techniques on the same frequency for a certain sector in air space to communicate with airplanes having aircraft radios for communication purposes. The air traffic control system typically comprises a ground system that may be assigned to an airport, in particular its tower. An operator at the airport, also called airport traffic operator, is enabled to communicate with the several airplanes in the respective air space observed as the ground system is configured to receive aircraft radio signals, in particular voice signals (radio messages), from the pilots of the different airplanes communicating with the base station. In addition, the operator may also transmit voice signals to the respective pilots to inform the pilots appropriately. Generally, the voice signals correspond to radio signals or rather radio messages (radio traffic).

Due to the increasing number of airplanes processed by an airport, the number of aircraft radio signals exchanged, namely the radio traffic, also increases dramatically. Thus, it might happen that at least two aircraft radio signals are received simultaneously in the same frequency range so that the respective aircraft radio signals interfere with each other. Thus, the operator in the tower of the airport is not enabled to understand what the pilots of the airplanes have reported over radio. So far, the operator has to manually inform the pilots, in particular all pilots, via radio about the simultaneous call transmission (SCT) requesting to repeat the respective information on different frequency bands or rather in a subsequent manner. In other words, the operator in the tower has to detect and inform the pilots manually about the simultaneous call transmission. In turn, the pilots have to confirm receipt of the respective information from the tower with regard to the simultaneous call transmission manually. Thus, the operator can be ensured that the pilots change the frequency or rather the pilots of the different airplanes communicate with the tower in a successive manner to avoid interfering aircraft radio signals. Accordingly, the effort and the costs related thereto are high to ensure that the pilots of the airplanes and the tower can communicate with each other in a satisfying manner.

Therefore, there is a need for an easier and more cost-efficient manner to handle simultaneous call transmission.

SUMMARY

Embodiments of the present disclosure provide an air traffic control system. In an embodiment, the system comprises at least two aircraft radios and a ground system. The ground system has an operator device and at least one ground radio station that is configured to communicate with the at least two aircraft radios. The ground system further has a simultaneous transmission detection unit that is configured to detect at least two aircraft radio signals received simultaneously by the at least one ground radio station. The at least one ground radio station is configured to forward information with regard to the simultaneous transmission detection of at least two aircraft radio signals to at least one of the at least two aircraft radios.

Further, embodiments of the present disclosure provide a method of simultaneous call transmission handling, with the following steps:

detecting at least two aircraft radio signals of aircraft radios received simultaneously by a ground system, in particular at least one ground radio station of the ground system, and forwarding information with regard to the simultaneous transmission detection of at least two aircraft radio signals to at least one of the at least two aircraft radios via the ground system.

The present disclosure is based on the finding that the handling of simultaneous call transmission (SCT) can be simplified as an operator operating at the operator device of the air traffic control system is not required to manually communicate with the different pilots of the aircraft via radio. The air traffic control system has a ground system that is enabled to automatically detect and communicate with the aircraft radios of the airplanes. Thus, it is no more necessary that the operator, for instance the operator in a tower of an airport, has to detect the simultaneous receipt manually and to inform the pilots of the aircrafts manually via radio. The pilots are informed by the ground system (without manual interaction of the operator) since the respective information with regard to the simultaneous transmission detection of at least two aircraft radio signals is forwarded to the respective aircraft radio, for example the airplane assigned thereto.

Generally, the simultaneous call transmission (SCT) deals with aircraft signals from different aircraft radios. This is different to the same signal being transmitted at least twice by the same aircraft radio as those signals relate to a single call.

According to an aspect, the at least one ground radio station is configured to forward the information automatically once the simultaneous transmission detection unit has detected that at least two aircraft radio signals are received simultaneously. The pilot(s) of the respective airplane(s) is/are informed automatically about the simultaneous call transmission so that the operator of the ground system is relieved from manually communicating with the pilots.

Further, the ground system may have an indication unit that is configured to indicate the status of transmission. The handling of simultaneous call transmission is further simplified by indicating the respective information via an indication unit assigned to the ground system. Generally, the indication unit may be an acoustic one or an optical one so that the respective indication is done in an optical manner or rather acoustic manner.

The status of transmission may comprise information with regard to the simultaneous receipt of the at least two aircraft radio signals detected by the simultaneous transmission detection unit. In other words, the simultaneous receipt of the at least two aircraft radio signals is indicated at the ground system. Thus, the operator of the ground system is informed appropriately about the simultaneous receipt of the at least two aircraft radio signals.

The indication of the simultaneous receipt of at least two aircraft radio signals may be transmitted automatically, namely without any manual input.

Even though the information with regard to the simultaneous transmission detection of at least two aircraft radio signals may be forwarded to the airplane(s) automatically, the operator of the ground system may be informed about the respective situation as a failsafe option or rather for redundancy.

The status of transmission may comprise information with regard to the reception of the forwarded information by the respective aircraft radio. In other words, reception or rather safe receipt of the forwarded information by the respective aircraft radio is indicated at the ground system. Thus, the operator at the ground system is informed via the indication unit whether or not the forwarded information was received safely by the respective aircraft radio.

This information may also be transmitted automatically which means without any manual input by the pilot.

For instance, the reception of the forwarded information is indicated in an optical manner.

The status of transmission may further comprise information with regard to an acknowledgement of the forwarded information by a person interacting with the respective aircraft radio. In other words, reception of the forwarded information is acknowledged by a person interacting with the respective aircraft radio, for example wherein the acknowledgement is indicated at the ground system. The person that interacts with the aircraft radio may be the pilot of the airplane. Hence, the operator at the ground system is informed by the indication unit, namely the indication provided, whether or not the pilot or rather person interacting with the respective aircraft radio has understood the respective information.

In some embodiments, an acknowledgement member is assigned to the respective aircraft radio enabling a pilot to acknowledge receipt of the transmitted information with regard to the simultaneous transmission detection. The pilot may interact with the acknowledgement member to inform the operator at the ground system appropriately. The acknowledgment member may be a button or another member that is easy to operate. The pilot that has received the forwarded information simply hits the acknowledgement member, for instance the button, to transmit an acknowledgement signal to the ground system. The acknowledgement signal is received, processed and indicated by the ground system. Hence, the operator of the ground system is informed accordingly.

Even though this information requires manual input by the person interacting with the respective aircraft radio, for example the pilot, it is not necessary that this information is exchanged by voice or rather via radio. In fact, the information may be transmitted to the ground system differently.

In any case, the acknowledgement can be visualized by the indication unit in a simplified manner at the ground system so that the operator of the ground system is enabled to easily and fast recognize the acknowledgement.

Again, the acknowledgement of the forwarded information may be indicated in an optical manner.

In some embodiments, no verbal communication between the operator of the ground system and the person interacting with the respective aircraft radio is necessary.

Moreover, the indication unit has at least one indication member for indicating the respective status of transmission, for example wherein the indication member is an optical one, for instance a light emitting diode (LED). Thus, the respective status of transmission such as information about the receipt of the forwarded information and/or the acknowledgement of the forwarded information may be indicated by a respective indication member, for instance a light emitting diode or any other indication member. Therefore, the operator at the ground system is enabled to easily recognize whether or not the respective information was received or rather acknowledged.

Once again, verbal communication such as radio communication between the operator of the ground system and the person interacting with the respective aircraft radio is not necessary for exchanging the respective information.

Furthermore, an indicator may be provided that is assigned to the respective aircraft radio, wherein the indicator is configured to indicate the status of transmission. Hence, the pilot gathers the respective information forwarded by the ground system, for example the information with regard to the status of transmission, via the indicator located in the airplane.

The indicator may be at least one of an optical indicator or an acoustic indicator. Thus, a graphical user interface (GUI) and/or a voice alert may be used for indicating the respective status of transmission in the aircraft. The voice alert can be a recorded one or rather an automatic one that is replayed. In any case, the pilot of the airplane gets informed appropriately without the need of verbally communicating with the operator of the ground system via radio.

Another aspect provides that the at least one ground radio station is configured to transmit the information with regard to the simultaneous transmission detection via the same frequency range as the aircraft radio signals and/or a different frequency range with respect to the one used by the aircraft radio signals. Thus, it is ensured that the respective information is received by the airplanes. However, a different frequency range may be used so as to ensure that no interfering occurs which might disturb forwarding the information.

For instance, the different frequency range corresponds to a forbidden frequency range for aircraft radio signals. This ensures that the information with regard to the simultaneous transmission detection is not interfered by other aircraft radio signals since the aircraft radios are not allowed to use the respective frequency range. In other words, the frequency range used for forwarding the respective information is exclusively assigned to the ground system for forwarding this kind of information, namely informing pilots about the simultaneous transmission detection or rather the simultaneous call transmission (SCT).

According to another aspect, the ground system has several ground radio stations wherein the ground system is configured to transmit the information via all ground radio stations and/or to select one of the several ground radio stations for transmitting the information. Thus, it is ensured that the respective information is transmitted and received by the aircraft radio safely. By transmitting the information via all ground radio stations, it is ensured that the best combination of aircraft radio and ground radio station is used for exchanging the information. However, selecting the best combination requires a further determination which of the several ground radio stations shall be used. Accordingly, using all ground radio stations available is the less complex way to ensure that the respective information is transmitted and received safely.

For instance, the respective ground radio station is selected that has best transmission properties and/or shortest distance to the respective aircraft radio. Thus, position data of the aircraft as well as the respective ground radio station, for instance obtained by global positioning system (GPS) or Global Navigation Satellite System (GLONASS), may be used for determining the shortest distance. This approach is based on the idea that the best transmission properties should be achieved by the shortest distance between the respective ground radio station and the respective aircraft radio.

Alternatively or additionally, the best transmission properties may be determined for selecting the respective ground radio station that shall transmit the respective information. This approach corresponds to best signal selection since the transmission properties are evaluated and compared with each other.

Moreover, the ground system may be configured to transmit the information with regard to the simultaneous transmission detection to a data storage, a recording blackbox, a logging server, another operator device, for instance one of a different ground system, and/or a supervisor. Thus, it is ensured that the respective information is shared with several devices or rather components of the air traffic control system. Hence, the respective information is stored or rather distributed. The supervisor may supervise the operator of the ground system. However, the supervisor is optional since the supervisor is not necessary for running the air traffic control system properly.

According to another embodiment, the ground system is configured to transmit the information with regard to the simultaneous transmission detection with a predefined pattern that has a maximized signal-to-noise ratio (SNR). The occurring noise is reduced by choosing a dedicated pattern which in turn ensures that the information is received in an optimal manner.

Furthermore, the system may be configured to broadcast the aircraft radio signals and/or the status of transmission to all ground radio stations. The aircraft radio(s) or rather the receiving ground radio station may broadcast the aircraft radio signals and/or the status of transmission to all other ground radio stations of the ground system so as to distribute the respective information.

The aspects described above apply for the air traffic control system according to the present disclosure as well as the method of simultaneous call transmission handling according to the present disclosure in a simultaneous manner.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
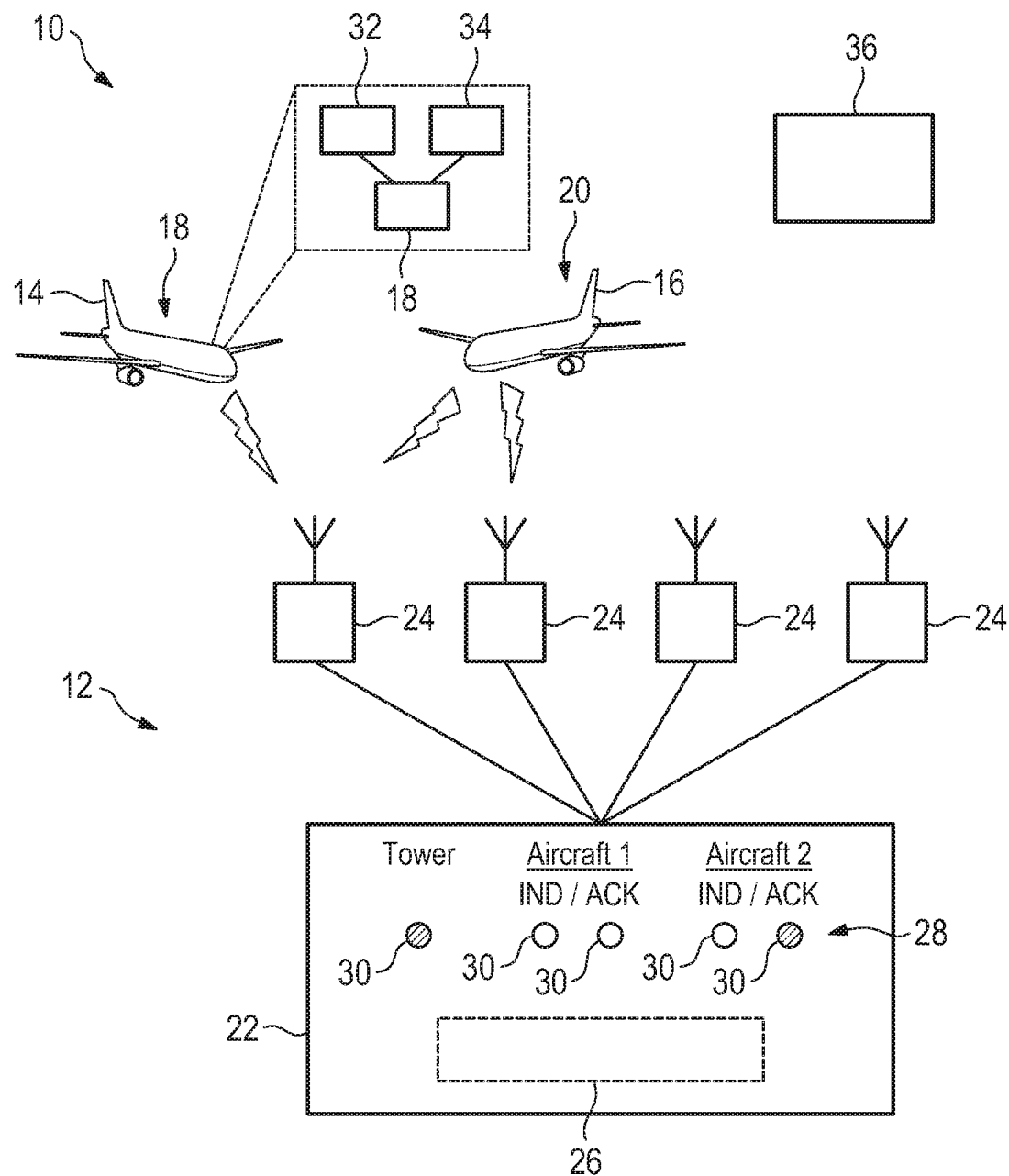
FIG. 1 schematically shows an overview of an example air traffic control system according to the present disclosure, and FIG. 2 schematically shows a flow-chart illustrating an example method of simultaneous call transmission handling according to the present disclosure.

In FIG. 1, an air traffic control system 10 is shown that comprises a ground system 12 as well as two airplanes 14, 16 each having an aircraft radio 18, 20. The ground system 12 comprises an operator device 22 that is connected to several ground radio stations 24 each having an antenna for communicating with the aircraft radios 18, 20 of the airplanes 14, 16.

In addition, the ground system 12 has a simultaneous transmission detection unit 26 that is configured to detect at least two aircraft radio signals received simultaneously by a single ground radio station 24 of the several ground radio stations 24, for example its antenna. Furthermore, the ground system 12, for example the simultaneous transmission detection unit 26, has an indication unit 28 that is configured to indicate the status of transmission as will be described hereinafter with respect to FIG. 2.

The indication unit 28 is configured to indicate simultaneous receipt of the at least two aircraft radio signals that was detected by the simultaneous transmission detection unit 26. For this purpose, the indication unit 28 has several indication members 30 for indicating respective information related to the status of transmission. The indication members 30 are established by optical indication members such as light emitting diodes (LEDs).

Furthermore, each airplane 14, 16 has an indicator 32 as well as an acknowledgement member 34 as schematically depicted in FIG. 1.

Figure 2:
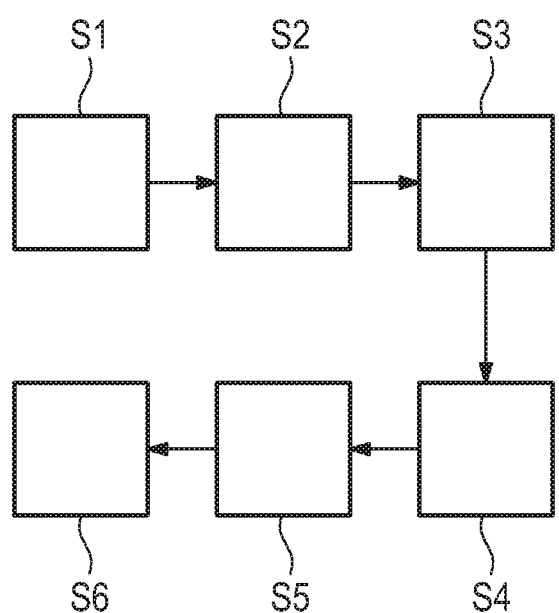

The operating principle of the air traffic control system 10 will be described hereinafter with respect to FIG. 2 in which a flow-chart is shown that illustrates a method of simultaneous call transmission handling.

In a first step S1, it is detected that at least two aircraft radio signals are received simultaneously. The simultaneous receipt is detected by the simultaneous transmission detection unit 26 of the ground system 12. In some embodiments, the simultaneous transmission detection unit 26 detects whether one of the several ground radio stations 24 receives two or more aircraft radio signals simultaneously.

In a second step S2, the simultaneous receipt of the at least two aircraft radio signals is indicated at the ground system 12 via the indication unit 28, for example the respective indication member 30 as shown in FIG. 1. The simultaneous call transmission (SCT) can be indicated by a dedicated LED.

In a third step S3, information with regard to the simultaneous transmission detection of at least two aircraft radio signals is forwarded to at least one of the at least two aircraft radios 18, 20 via the ground system 12.

In a fourth step S4, the forwarded information is received by the respective aircraft radio 18, 20. The respective aircraft radio 18, 20 processes the information appropriately.

The forwarded information is indicated in the airplane 14, 16 by the respective indicator 32 to inform the pilot about the simultaneous call transmission (SCT). Thus, the indicator 32 assigned to the respective aircraft radio 18, 20 indicates the status of transmission, namely the simultaneous call transmission (SCT).

The indicator 32 may be established by an optical indicator and/or an acoustic indicator so that the pilot of the corresponding airplane 14, 16 is informed about the simultaneous call transmission (SCT) detected by the simultaneous transmission detection unit 26 in an optical manner or rather in an acoustic manner. For instance, the indicator 32 at least comprises a graphical user interface and/or a voice alert such as an automatic voice alert and/or recorded voice alert that is replayed for informing the pilot appropriately.

In a fifth step S5, the reception of the forwarded information is indicated at the ground system 12, for example via the indication unit 28. For example, the indication unit 28 has a respective indication member 30, namely a LED or generally an optical indication member, that is used for indicating the receipt of the forwarded information by the respective airplane 14, 16.

The reception is automatically detected so that no manual interaction is necessary to provide the information about the occurrence of the simultaneous call transmission (SCT) and to inform the pilots of the airplanes 14, 16 about the simultaneous call transmission (SCT).

The respective information, namely the signals encompassing the respective information, are exchanged automatically in some embodiments. Thus, no communication via radio or any verbal communication between the respective pilot of the corresponding airplane 14, 16 and the operator of the ground system 12 is required.

In a sixth step S6, the reception of the forwarded information is acknowledged by a person interacting with the respective aircraft radio 18, 20, namely the pilot of the corresponding airplane 14, 16.

The forwarded information is acknowledged manually by the pilot while interacting with the acknowledgement member 34 assigned to the respective aircraft radio 18, 20. Hence, the pilot is enabled to acknowledge receipt of the transmitted information with regard to the simultaneous transmission detection in an easy and fast manner.

In other words, the pilot of the respective airplane 14, 16 can indicate that he has understood the information forwarded, namely the occurrence of the simultaneous call transmission (SCT).

Once the acknowledgement is done by the pilot, an acknowledgement signal is transmitted from the respective aircraft radio 18, 20 to the ground system 12. At the ground system 12, the acknowledgement is indicated via the indication unit 28 so that the operator of the ground system 12 is informed about the acknowledgement. The indication unit 28 has a respective indication member 30, namely a LED or generally an optical indication member, for indicating the acknowledgement by the pilot of the airplane 14, 16.

Accordingly, the operator at that ground system 12 is enabled to directly and easily receive information whether or not the information with regard to the simultaneous transmission detection is received by the respective airplane 14, 16 and/or acknowledged by the pilot of the corresponding airplane 14, 16.

The information with regard to the simultaneous transmission detection may be transmitted by the ground system 12 via the same frequency range as the aircraft radio signals and/or a different frequency range with respect to the one used by the aircraft radio signals.

For instance, the different frequency range corresponds to a frequency range that is forbidden for aircraft radio signals. This ensures that no interference occurs in the frequency range with any aircraft radio signals. Accordingly, the respective pilot(s) receive(s) the information about the occurrence of the simultaneous call transmission (SCT).

For transmitting the respective information, the ground system 12 is enabled to transmit the signal(s) via all of the several ground radio stations 24.

The ground system 12 may also be configured to select one of the several ground radio stations 24 promising best transmission properties. For instance, the respective ground radio station 24 is selected that has best transmission properties determined previously.

Alternatively or additionally, the shortest distance to the respective aircraft radio 18, 20 may be determined previously by taking geolocation position information of the respective ground radio stations 24 and airplanes 14, 16 into account. In some embodiments, is assumed that the shortest distance yields best transmission properties.

The information with regard to the simultaneous transmission detection may be transmitted by the ground system 12 with a predefined pattern that has a maximized signal-to-noise ratio (SNR). Hence, best transmission properties are ensured.

In addition, the air traffic control (ATC) system 10 may transmit the information with regard to the simultaneous transmission detection to another unit 36, for instance a data storage, a recording blackbox, a logging server, another operator device, for instance one of a different ground system, and/or a supervisor. Despite the information with regard to the simultaneous transmission detection, the received aircraft radio signal(s) may be forwarded to the other unit 36.

This ensures that the respective information is shared with several units or rather components of the respective air traffic control system 10. Hence, the respective information is stored or rather distributed. Moreover, the respective information, namely the aircraft radio signals and/or the status of transmission, is shared with other ground system(s) that may be assigned to the air traffic control system.

Generally, the air traffic control system 10 may be configured to broadcast the aircraft radio signals received and/or the status of transmission to all ground radio stations 24.

The respective information may be transmitted by the aircraft radio(s) 18, 20 or rather the receiving ground radio station 24 that broadcasts the information to the other ground radio stations 24 of the air traffic control system 10.

In general, an automatic detection of simultaneous received aircraft radio signals is provided by the air traffic control system 10. Further, a method of automatic simultaneous call transmission handling is provided wherein the method can be performed by the air traffic control system 10.

Since the respective detection and signal exchange is done automatically, it is not required that the operator of the ground system 12 verbally communicates or rather speaks with the respective pilot in a manual manner.

Moreover, it is not necessary that the pilot manually acknowledges the receipt of the information since the pilot simply interacts with the acknowledgement member 34 assigned to the respective aircraft radio 18, 20, for instance a button, so that the acknowledgement is automatically forwarded to the ground system 12 which is indicated at the ground system 12 via the indication unit 28.

Certain embodiments disclosed herein utilize circuitry (e.g., one or more circuits) in order to implement protocols, methodologies or technologies disclosed herein, operably couple two or more components, generate information, process information, encode signals, decode signals, transmit and/or receive signals, etc. Circuitry of any type can be used. For example, as described above, the aircraft radio 18, 20, the simultaneous transmission detection unit 26, the indication unit 28 or other components of the system may include, in some embodiments, logic for implementing the technologies and methodologies described herein. This logic of these components can be carried out in circuitry that includes hardware or a combination of hardware and software. In some embodiments, logic of these components is carried out in software.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In an embodiment, circuitry includes a baseband integrated circuit or applications processor integrated circuit or a similar integrated circuit in a server, a broadcast/streaming device, such as for example a cellular network device, an OTA network device, an OTT network device, a satellite network device, an internet protocol device, etc., and other network devices, or other computing devices. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes one or more memory devices that, for example, store instructions or data. Non-limiting examples of one or more memory devices include volatile memory (e.g., Random Access Memory (RAM), non-volatile memory (e.g., Read-Only Memory (ROM), or the like. The one or more memory devices can be coupled to, for example, one or more computing devices by one or more instructions, data, or power buses. In an embodiment, circuitry may also include a computer-readable media drive configured to accept signal-bearing medium (e.g., computer-readable memory media, computer-readable recording media, or the like). In an embodiment, a program for causing a system or device to execute any of the disclosed methods can be stored on, for example, a computer-readable recording medium (CRMM), a signal-bearing medium, or the like.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An air traffic control system comprising at least two aircraft radios and a ground system, wherein the ground system has an operator device and at least one ground radio station configured to communicate with the at least two aircraft radios, wherein the ground system further has a simultaneous transmission detection unit that is configured to detect at least two aircraft radio signals received simultaneously by the at least one ground radio station, and wherein the at least one ground radio station is configured to forward information with regard to the simultaneous transmission detection of at least two aircraft radio signals to at least one of the at least two aircraft radios, wherein the ground system is configured to transmit the information with regard to the simultaneous transmission detection with a predefined pattern that has a maximized signal-to-noise ratio.

2. The air traffic control system according to claim 1, wherein the ground system has an indication unit that is configured to indicate a status of transmission.

3. The air traffic control system according to claim 2, wherein the status of transmission comprises information with regard to the simultaneous receipt of the at least two aircraft radio signals detected by the simultaneous transmission detection unit.

4. The air traffic control system according to claim 2, wherein the status of transmission comprises at least one of information with regard to a reception of the forwarded information by the respective aircraft radio or information with regard to an acknowledgement of the forwarded information by a person interacting with the respective aircraft radio.

5. The air traffic control system according to claim 1, wherein an acknowledgement member is assigned to the respective aircraft radio enabling a pilot to acknowledge receipt of the forwarded information with regard to the simultaneous transmission detection.

6. The air traffic control system according to claim 1, wherein the indication unit has at least one indication member for indicating a respective status of transmission.

7. The air traffic control system according to claim 6, wherein the indication member is an optical one.

8. The air traffic control system according to claim 1, wherein an indicator is provided that is assigned to the respective aircraft radio, wherein the indicator is configured to indicate a status of transmission.

9. The air traffic control system according to claim 8, wherein the indicator is at least one of an optical indicator and an acoustic indicator.

10. The air traffic control system according to claim 1, wherein the at least one ground radio station is configured to transmit the information with regard to the simultaneous transmission detection via at least one of the same frequency range as the aircraft radio signals and a different frequency range with respect to the one used by the aircraft radio signals.

11. The air traffic control system according to claim 10, wherein the different frequency range is forbidden for aircraft radio signals.

12. The air traffic control system according to claim 1, wherein the ground system has several ground radio stations, and wherein the ground system is configured to at least one of transmit the information via all ground radio stations and select one of the several ground radio stations for transmitting the information.

13. The air traffic control system according to claim 12, wherein the respective ground radio station is selected that has shortest distance to the respective aircraft radio.

14. The air traffic control system according to claim 1, wherein the ground system is configured to transmit the information with regard to the simultaneous transmission detection to at least one of a data storage, a recording blackbox, a logging server, another operator device, or a supervisor.

15. The air traffic control system according to claim 1, wherein the ground system is configured to broadcast at least one of the aircraft radio signals or a status of transmission to all ground radio stations.

16. A method of simultaneous call transmission handling, comprising:
    detecting at least two aircraft radio signals of aircraft radios received simultaneously by a ground system;
    forwarding information with regard to the simultaneous transmission detection of at least two aircraft radio signals to at least one of the at least two aircraft radios via the ground system;
    inputting, by a person interacting with the at least one of the at least two aircraft radios, an acknowledgement indicating receipt of the forwarded information; and
    transmitting, based on the acknowledgement inputted by the person interacting with the at least one of the at least two aircraft radios, an acknowledgement signal to the ground system to inform the ground system of receipt of the forwarded information by the person interacting with the at least one of the at least two aircraft radios.

17. The method according to claim 16, wherein at least one of the simultaneous receipt of the at least two aircraft radio signals or reception of the forwarded information by the at least one of the at least two aircraft radios is indicated at the ground system.

18. The method according to claim 16, wherein the acknowledgement is indicated at the ground system.

19. The method according to claim 16, wherein the acknowledgement inputted by the person interacting with the at least one of the at least two aircraft radios is non-verbal.

20. An air traffic control system comprising at least two aircraft radios and a ground system, wherein the ground system has an operator device and at least one ground radio station configured to communicate with the at least two aircraft radios, wherein the ground system further has a simultaneous transmission detection unit that is configured to detect at least two aircraft radio signals received simultaneously by the at least one ground radio station, and wherein the at least one ground radio station is configured to forward information with regard to a simultaneous transmission detection of the at least two aircraft radio signals to at least one of the at least two aircraft radios, wherein an acknowledgement input is assigned to the at least one of the at least two aircraft radios enabling a pilot to acknowledge receipt of the forwarded information with regard to the simultaneous transmission detection, wherein pilot interaction with the acknowledgement input automatically causes transmission of an acknowledgement signal to the ground system to inform the ground system of receipt by the pilot of the forwarded information.

* * * * *